ial components of the gas issuing from the sets nearest the plane are a maximum and from the sets furthest from the plane are a minimum. Thus in one arrangement having six equi-angularly spaced sets of vanes, no tangential
United States Patent Office 2,955,417
Patented Oct. 11, 1960

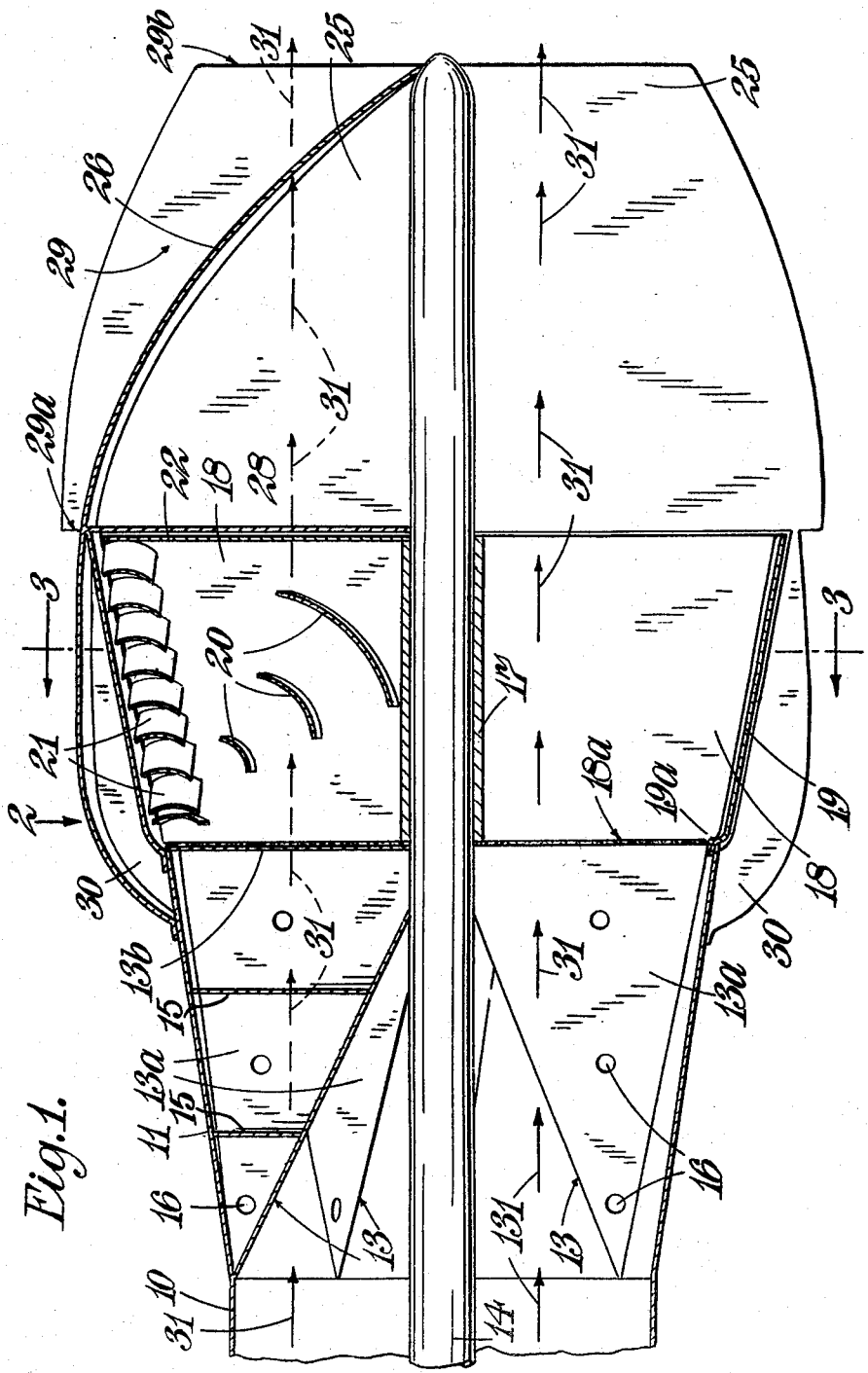

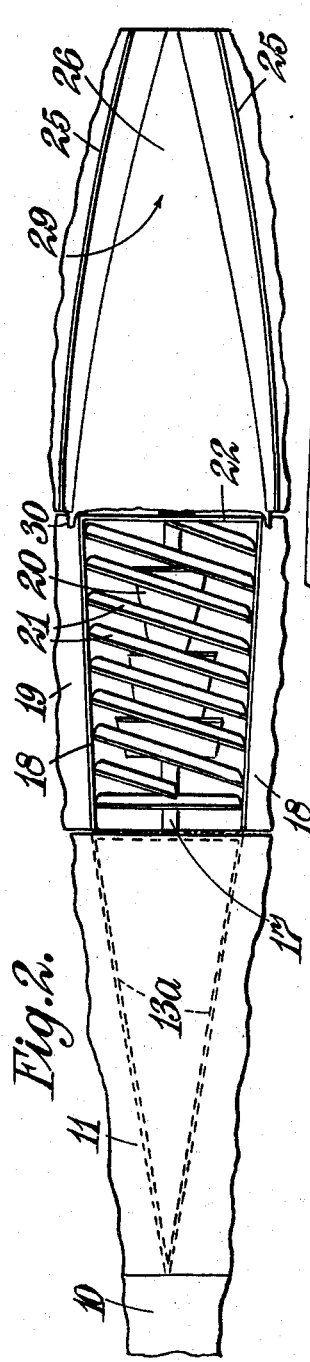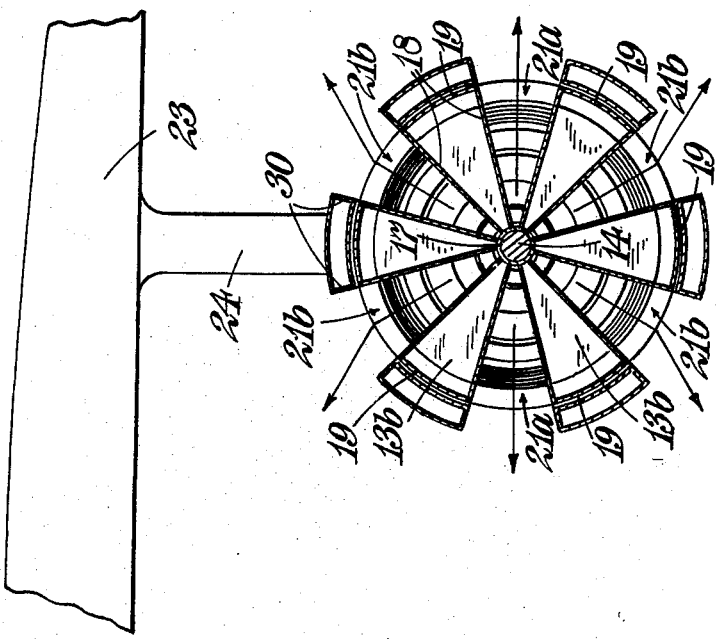

2,955,417

JET PROPULSION NOZZLE WITH THRUST REVERSING MEANS

David Morris Brown, Alvaston, England, assignor to Rolls-Royce Limited, Derby, England, a British company Filed Mar. 1, 1957, Ser. No. 643,385

Claims priority, application Great Britain Mar. 5, 1956

3 Claims. (Cl. 60—35.54)

This invention comprises improvements in or relating to jet nozzles for propulsion purposes.

Jet nozzles for propulsion purposes have been proposed which include means for obtaining a reverse thrust, so that for example, when the jet nozzle is employed in an aircraft a braking effect can be obtained as well as a propulsive effect. In jet nozzles for aircraft propulsion, the reverse thrust means may comprise a series of vanes (or the equivalent) outside the diameter of the jet pipe, to which gas from the jet pipe is diverted and by which the direction of travel of the gas is turned through more than 90° to have components of velocity both in a forward direction, that is in a direction opposite to the normal flow of gas in the jet nozzle, and in the radially outward direction from the nozzle axis, the radial component being desirable to carry the gas clear of the aircraft skin immediately upstream of the location of the vanes. The gas may issue from the thrust reversing means as an annular jet or as a series of equi-angularly spaced jets.

It has been found, however, with previously proposed jet nozzles having thrust-reversing means, that the gas issuing from the thrust-reversing means may impinge on other parts of the aircraft structure and this may result in damage to the aircraft structure and other disadvantages.

This invention has for an object to provide an improved jet nozzle having thrust-reversing means whereby these difficulties are avoided.

According to the present invention, a jet nozzle is provided with thrust-reversing means having vanes (or the equivalent) extending at least partly around the axis of the nozzle which are adapted, when operative, not only to turn the issuing gas to have radial and forward velocity components, but also to impart to some of the gas a velocity component tangential to the thrust-reversing means, it being arranged that the resultant radial thrust and the resultant tangential thrust acting on the thrust-reversing means are substantially zero.

In the case where the vanes (or the equivalent) extend completely around the nozzle axis, the vanes are preferably such that the tangential components imparted to gas issuing to one side of an axial plane through the nozzle are a "mirror image" of those imparted to gas issuing on the other side of the axial plane, and such that the tangential components applied are a maximum for the streams of gas issuing adjacent this plane and decrease progressively to zero in the axial plane normal to the first said plane, the streams of gas being directed away from the first said plane.

In the case where the vanes (or the equivalent) extend in angularly-spaced sets about the axis of the nozzle, the vanes are preferably such that the tangential components imparted to gas issuing from the sets on one side of an axial plane through the nozzle are a "mirror image" of those on the other side of the plane, and that the tangential component is imparted in a diametrically-opposite pair of the sets which are symmetrical about a plane at right angles to said axial plane, and tangential components of equal magnitude are imparted in the remaining four sets, the direction of each of the tangential components being towards the adjacent set in which no tangential component is imparted.

One construction of thrust-reversing jet nozzle incorporating the invention will now be described with reference to the accompanying drawings, in which—

Figure 1 is an axial section through the jet nozzle, with the parts of the jet nozzle positioned for normal operation, Figure 2 is a true view in the direction of arrow 2 on Figure 1 with parts cut away, and Figure 3 shows the jet nozzle in section on the line 3—3 of Figure 1 with the jet nozzle parts positioned to produce reverse thrust, the jet nozzle forming the outlet from a pod-mounted jet-propulsion engine.

Referring first to Figures 1 and 2, the jet nozzle is of the convergent/divergent kind and is positioned at the end of a jet pipe 10 conveying exhaust gases from the engine.

The convergent section of the jet nozzle comprises a frusto-conical wall 11 having its smaller end attached to the jet pipe 10, and a series of, say, six V-form sheetmetal pieces 13, the walls 13a of the pieces 13 being secured along their free edges to the inner surface of the wall 11. The side walls 13a of each piece 13 are substantially triangular, and meet in a line which is inclined to the nozzle axis so as to intersect the wall 11 at its upstream end and to intersect the nozzle axis in the plane of the downstream end of the wall 11. The radially-inner ends of the pieces 13 are secured to a fixed spindle 14 extending coaxially through the nozzle. The pieces 13 are closed at their downstream ends by end walls 13b and are provided internally with partitions 15 to divide them into a number of spaces communicating through holes 16 with the trough-like gas channels afforded between the pieces thereby to balance the pressure on each side of the walls 13a and to permit the use of a lighter construction.

The dimensions of the wall 11 and of the pieces 13 are selected so that the total cross-sectional area of the gas path through this section of the nozzle decreases from its upstream end to its downstream end, thereby to provide a throat at the downstream end of the section.

The divergent section of the nozzle comprises a sleeve 17 mounted to rotate on the spindle 14 and having secured to it a series of equi-angularly-spaced radial walls 18. The walls 18 are equal in number to the total number of walls 13a and thus the walls 18 can be axially aligned with the downstream edges of the walls 13a.

The radially-outer edges of the walls 18 are contained in the surface of a cone of somewhat greater apex angle than the wall 11, and the spaces between the walls are arranged both to provide the divergent portion of the nozzle and to accommodate the thrust-reversing means. Thus alternate spaces are closed at the radially-outer ends by part-frusto-conical walls 19 and are left open at the axially-spaced ends so that, when these spaces are aligned with the trough-like channels between the pieces 13, the exhaust gas can flow axially through these spaces, and the remaining spaces contain vanes 20, 21 forming the thrust-reversing means and are closed at their downstream ends by sector-shaped walls 22 so that, when these spaces are aligned with the outlets from the channels between the pieces 13, the exhaust gas cannot flow straight through the nozzle but is deflected in a manner to produce reverse thrust. Sealing means is provided between the forward ends of walls 18, 19 and the downstream ends of walls 13a, 11, around the gas passages, as indicated at 18a, 19a.

The vanes 20 are provided to assist in turning the exhaust gas to a radially-outward direction, and each of the sets of axially-spaced vanes 21 is shaped and positioned at least to ensure that the gas which issues through the set has components of velocity in the forward direction and in the radially-outward direction, and moreover some sets of vanes 21 are adapted in the manner shown in Figures 1 and 2 also to impart a tangential component of velocity to the issuing gas. Thus, as shown, the vanes 21 are not only concave with the concavities facing upstream relative to the normal direction of flow through the nozzle, but also they are inclined at an acute angle to the true tangential direction. It will be noticed that the upstream vane of each set is truly circumferential.

Referring to Figure 3, there is shown a nozzle as just described employed with a pod-mounted engine. An aircraft wing is indicated at 23 and the engine support strut is indicated at 24. In this arrangement, two sets 21a of vanes 21 are positioned to be symmetrical about the horizontal plane through the axis of the nozzle and the vanes of these sets are such as merely to impart radial and forward velocity components; the vanes of these sets are thus curved-section vanes of true circular form about the axis of the nozzle. The remaining four sets 21b of vanes 21 are as shown in Figures 1 and 2 and are thus adapted to impart additionally a tangential component of velocity to the issuing gas, the component being in a direction towards the sets 21a and away from the vertical plane through the axis of the nozzle. The tangential components of each set 21b are equal in magnitude and thus the components imparted by the sets of vanes 21b on one side of the vertical plane can be considered as being a "mirror image" of those imparted by the sets of vanes 21b on the other side of this plane. Also, it will be clear that the resultant radial thrust and the resultant tangential thrust on the thrust-reversing means is zero.

The jet nozzle may also comprise means to reduce its aerodynamic drag. This means comprises sector-shaped pieces fixed on the end of the spindle 14 in alignment with the pieces 13. Each sector-shaped piece has radial walls 25, a fairing wall 26, and an end wall 28. The walls 25 have at their upstream ends a greater radial extent than the walls 18, and the fairing walls 26 are shaped to form inwardly-curved outwardly-open channels 29 leading from inlets 29a, which are radially outside and in alternate sectors to the channels in the normal gas path through the nozzle, to outlets 29b between the streams of gas issuing from the nozzle. The sector-shaped pieces are connected with wall 11 by bridge members 30 to stiffen the structure.

The normal rearward path for the gas flow through the jet nozzle is indicated by the arrows 31, and gas flows in this path when the spaces bounded by walls 18, 19 are aligned both with the channels between the pieces 13 and with the spaces between adjacent sector-shaped pieces 25, 26, 28. With the parts in this position an air flow is induced through channels 29 so reducing the aerodynamic drag.

By turning the divergent section 17—21 through 30° under control of any suitable reversible motor means, the parts are brought to the position of Figure 3 in which the spaces containing the vanes 20, 21 are aligned with the spaces between pieces 13 and reverse thrust is obtained.

The invention is also applicable to jet nozzles of by-pass gas-turbine engines, for instance to the jet nozzles as described in U.S. patent application 641,607.

I claim:

1. A jet propulsion nozzle having a rearwardly facing outlet for normal thrust operation and thrust reversing outlet means adapted when operative to deflect propulsive gases forwardly to produce a reverse thrust, said thrust reversing means including a series of axially-spaced gas deflecting vanes, said vanes extending circumferentially of the nozzle axis and being shaped to impart to gas issuing through the thrust reversing outlet means components of velocity in directions radially of the nozzle axis and forwardly parallel to the nozzle axis, and some at least of said vanes having portions which are inclined at an acute angle to the tangential direction and additionally impart to gas issuing through the thrust reversing outlet means components of velocity tangential to the nozzle axis, there being such inclined vane portions on each side of a plane containing the nozzle axis, the inclined portions on one side of the plane being oppositely inclined to those on the other side of the plane such that the sum of the tangential thrust produced on said inclined portions is substantially zero.

2. A jet propulsion nozzle comprising thrust reversing means to deflect the propulsive gases forwardly when operative, said thrust reversing means comprising gas deflecting vane means extending at least partly round the nozzle axis, the vanes of said vane means extending generally circumferentially of the thrust reverser, the vanes being in sets angularly-spaced about the nozzle axis, and the vanes in at least the sets which are adjacent an axial plane containing the nozzle axis, being inclined to a transverse plane to impart to the issuing gas an axially forward velocity component and a tangential velocity component, the vanes of the sets on one side of the axial plane imparting tangential components to the gas issuing through them which are a "mirror image" of the tangential components produced by the sets of vanes on the other side of the axial plane, the tangential components imparted to the gas by sets of vanes nearest the axial plane being a maximum and the tangential components imparted to the gas by the sets of vanes furthest from the axial plane being a minimum.

3. A jet nozzle according to claim 2, having the vanes arranged in six equi-angularly spaced sets wherein it is arranged that no tangential component is imparted in a diametrically-opposite pair of the sets which are symmetrical about a plane at right angles to said axial plane, and tangential components of equal magnitude are imparted in the remaining four sets, the direction of each of the tangential components being towards the adjacent set in which no tangential component is imparted.

References Cited in the file of this patent

UNITED STATES PATENTS

| 2,510,506 | Lindhagen et al. | June 6, 1950 |
| 2,681,548 | Kappus | June 22, 1954 |
| 2,797,547 | Meulien | July 2, 1957 |

FOREIGN PATENTS

| 162,754 | Australia | May 9, 1955 |
| 1,090,067 | France | Oct. 13, 1954 |
| 745,720 | Great Britain | Feb. 29, 1956 |

OTHER REFERENCES

NACA, Technical Note 3664, "Summary of Scale-Model Thrust-Reverser Investigation," Povolny et al., February 1956.